(12) United States Patent
Tong et al.

(10) Patent No.: US 6,865,373 B2
(45) Date of Patent: Mar. 8, 2005

(54) APPARATUS AND METHOD FOR ENCODING AND DECODING DATA WITHIN WIRELESS NETWORKS

(75) Inventors: Wen Tong, Ottawa (CA); Vahid Tarokh, Belmont, MA (US)

(73) Assignee: Nortel Networks Limited, St. Laurent (CA)

( * ) Notice: Subject to any disclaimer, the term of this patent is extended or adjusted under 35 U.S.C. 154(b) by 480 days.

(21) Appl. No.: 10/144,950

(22) Filed: May 14, 2002

(65) Prior Publication Data

US 2003/0032452 A1 Feb. 13, 2003

Related U.S. Application Data

(60) Provisional application No. 60/291,954, filed on May 21, 2001.

(51) Int. Cl.$^7$ .................................................. H04B 7/02
(52) U.S. Cl. ........................ 455/63.1; 455/59; 455/101; 375/267; 375/265
(58) Field of Search .......................... 455/59, 60, 63.1, 455/65, 101; 375/260, 267, 265, 240, 296, 341

(56) References Cited

U.S. PATENT DOCUMENTS

| 5,859,875 A | | 1/1999 | Kato et al. ................... 375/267 |
| 6,115,427 A | * | 9/2000 | Calderbank et al. ........ 375/267 |
| 6,127,971 A | | 10/2000 | Calderbank et al. ........ 342/368 |
| 6,700,926 B1 | * | 3/2004 | Heikkila et al. ............ 375/221 |

FOREIGN PATENT DOCUMENTS

| EP | 0951091 A2 | 10/1999 | ............ H01Q/3/26 |

OTHER PUBLICATIONS

Alamouti, Siavash M., "A Simple Transmit Diversity Technique for Wireless Communications," IEEE Journal on Select Areas in Communications, vol. 16, No. 8, Oct. 1998, pp. 1451–1458.

Tarokh et al., "Space–Time Codes for High Data Rate Wireless Communication: Performance Criterion and Code Construction," IEEE Transactions on Information Theory, vol. 44, No. 2, Mar. 1998, pp. 744–765.

Tarokh et al., "Space–Time Block Coding for Wireless Communications: Performance Results," IEEE Journal on Selected Areas in Communications, vol. 17, No. 3, Mar. 1999, pp. 451–460.

Tarokh et al., "Space–Time Block Codes form Orthogonal Designs," IEEE Transactions on Information Theory, vol. 45, No. 5, Jul. 1999, pp. 1456–1467.

* cited by examiner

*Primary Examiner*—Edward F. Urban
*Assistant Examiner*—Blane J. Jackson
(74) *Attorney, Agent, or Firm*—Withrow & Terranova, PLLC

(57) ABSTRACT

The present invention is directed to apparatus and method for encoding and decoding data within a wireless network such that a MS preferably does not require multiple receivers to handle communications from BTSs with varying numbers of antennas. In embodiments of the present invention, a space-time matrix is utilized to encode the data streams being transmitted from a BTS such that a BTS with fewer antennas would simply have an encoding matrix with one or more of the columns or rows removed from the matrix. In this way, the MSs within the wireless network can be designed to decode with the use of only a single space-time encoding matrix, this space-time encoding matrix working for BTSs with various numbers of antennas.

21 Claims, 4 Drawing Sheets

APPARATUS AND METHOD FOR ENCODING AND DECODING DATA WITHIN WIRELESS NETWORKS

This application claims the benefit of U.S. Provisional Application No. 60/291,954 filed May 21, 2001, the disclosure of which is hereby incorporated by reference in its entirety.

FIELD OF INVENTION

The present invention relates to wireless networks and, more specifically, to encoding and decoding of data within wireless networks.

BACKGROUND OF THE INVENTION

Traditionally, wireless communication networks include a Base Transceiver Station (BTS) and a Mobile Station (MS), each of which include a single antenna. Problems with this traditional design include the limited power within the transmissions from the BTS to the MS, also known as downlink communications, and the difficulty in transmitting more than one downlink data stream concurrently.

In more recent wireless network designs, the BTS comprise two or more antennas in order to increase the power of downlink communication signals and to allow for easier transmission of more than one downlink data stream concurrently. To accomplish this with minimal errors and maximum power, an orthogonal space-time encoding matrix is utilized that dictates the transmission for each of the antennas for a series of time periods. For instance, the following matrix:

$$\begin{bmatrix} a & b \\ c & d \end{bmatrix}$$

indicates that "b" and "d" should be transmitted by first and second antennas respectfully at a first time period while "a" and "c" should be transmitted by the first and second antennas respectfully at a second time period.

One well-known space-time matrix S for the case that a BTS with two antennas is transmitting first and second complex numbered data streams ($x_1$, $x_2$) is as follows:

$$S = \begin{bmatrix} x_2 & x_1 \\ x_1^* & -x_2^* \end{bmatrix}$$

In this case, a transmitter coupled to a first antenna transmits $x_1$ at a first time period and transmits $x_2$ at a second time period. As well, a second transmitter coupled to a second antenna transmits $-x_2^*$ at the first time period and transmits $x_1^*$ at the second time period. It is noted that this matrix S is an orthogonal matrix which follows the property of:

$$S \cdot S^T = I$$

Another well-known space-time matrix S for the case that a BTS with four antennas is transmitting first, second and third complex numbered data streams ($x_1, x_2, x_3$) is disclosed in a published paper entitled "Space-Time Block Coding for Wireless Communications: Performance Results" by Tarokh et al., published in the IEEE Journal on Selected Areas in Communications, Vol. 17, No. 3, March 1999. In this well-known implementation, the space-time matrix (with slight formatting changes) is as follows:

$$S = \begin{bmatrix} \dfrac{x_3^*}{\sqrt{2}} & \dfrac{x_3^*}{\sqrt{2}} & -x_2^* & x_1 \\ \dfrac{-x_3^*}{\sqrt{2}} & \dfrac{x_3^*}{\sqrt{2}} & x_1^* & x_2 \\ \dfrac{(x_2 + x_2^* + x_1 - x_1^*)}{2} & \dfrac{(-x_2 + x_2^* - x_1 - x_1^*)}{2} & \dfrac{x_3}{\sqrt{2}} & \dfrac{x_3}{\sqrt{2}} \\ \dfrac{-(x_2 - x_2^* + x_1 + x_1^*)}{2} & \dfrac{(-x_2 - x_2^* + x_1 - x_1^*)}{2} & \dfrac{-x_3}{\sqrt{2}} & \dfrac{x_3}{\sqrt{2}} \end{bmatrix}$$

In this case, four transmitters coupled to four antennas (represented by the rows in the matrix) transmit different expressions of the data streams at four different time periods (represented by the columns in the matrix, the far right column being the earliest time period).

One key problem with this system of using orthogonal space-time encoding matrices is that they do not allow the MS to scale easily to BTSs with varying numbers of antennas. In particular, a MS must be able to decode the data being received no matter what the number of antennas are at the BTS and, therefore, a separate space-time decoder must be included in each MS for the case that the BTS has two antennas, three antennas, four antennas, etc. This adds considerable additional elements to the MS and therefore increases the financial and space costs.

SUMMARY OF THE INVENTION

The present invention is directed to apparatus and method for encoding and decoding data within a wireless network such that a MS preferably does not require multiple receivers to handle communications from BTSs with varying numbers of antennas. In embodiments of the present invention, a space-time matrix is utilized to encode the data streams being transmitted from a BTS such that a BTS with fewer antennas would simply have an encoding matrix with one or more of the columns or rows removed from the matrix. In this way, the MSs within the wireless network can be designed to decode with the use of only a single space-time encoding matrix, this space-time encoding matrix working for BTSs with various numbers of antennas.

The present invention, according to a first broad aspect, is a space-time decoder arranged to be coupled to an antenna within a receiver. In this aspect, the decoder includes a port, arranged to be coupled to the antenna, and a decoder coupled to the port. The port operates to receive space-time encoded data that is received on the antenna. The decoder operates to decode the encoded data in the case that the number of antennas by which the encoded data is transmitted to the antenna within the receiver is either one of a first number and a second different number.

The present invention, according to a second broad aspect, is a space-time decoder arranged to be coupled to an antenna within a receiver. The decoder includes a port, arranged to be coupled to the antenna, control logic and decoding logic coupled to the port and the control logic. The port operates to receive space-time encoded data that is received on the antenna. The control logic operates to determine the number of antennas by which the encoded data was transmitted to the antenna within the receiver. The decoding logic operates to decode the encoded data with a first orthogonal space-time matrix if the encoded data is transmitted via a first plurality of antennas and operates to decode the encoded data with a second orthogonal space-time matrix, which is a subset of the first matrix, if the encoded data is transmitted via a second plurality of antennas, the second plurality being less than the first plurality.

In another aspect, the present invention is a Mobile Station including an antenna along with control logic and decoding logic similar to that of the second broad aspect. In a further aspect, the present invention is a method for space-time decoding data at a receiver that has been transmitted via a plurality of antennas.

The present invention, according to a third broad aspect, is a space-time encoder arranged to be coupled to a plurality of transmitters. The encoder includes a port and space-time encoding logic coupled to the port. The port operates to receive a plurality of data streams. The space-time encoding logic operates to encode the plurality of data streams with an orthogonal space-time matrix such that each of the plurality of transmitters is forwarded a transmission for a plurality of time periods. According to this aspect, at least one subset of the space-time matrix, in which one or more sets of rows and columns are removed from the space-time matrix, is orthogonal.

In another aspect, the present invention is a Base Transceiver Station including a plurality of antenna along with a port and space-time encoding logic similar to that of the third broad aspect. In a further aspect, the present invention is a method for encoding a plurality of data streams for transmission on a plurality (n) of antennas.

The present invention, according to a fourth broad aspect, is a method for generating a space-time encoding matrix for use in transmitting a plurality of data streams to a receiver from a plurality of antenna within a wireless network. In this aspect, the method includes selecting a maximum number (n) of antennas to be used within the wireless network; selecting at least one other number (m) of antennas that could possibly be used in the wireless network; and determining an n×n space-time encoding matrix that is orthogonal and which has an m×m subset which is also orthogonal.

In yet another aspect, the present invention is a wireless network including first and second BTSs and a MS. The first BTS, with a first plurality of antennas, operates to encode a set of data streams with a first orthogonal space-time matrix and transmit the resulting encoded data on the first plurality of antennas. The second BTS, with a second plurality of antennas less than the first plurality, operates to encode a set of data streams with a second orthogonal space-time matrix, which is a subset of the first matrix, and transmit the resulting encoded data on the second plurality of antennas. The MS operates to receive encoded data from either one of the first and second BTSs, to decode the encoded data with the first matrix if the encoded data is transmitted from the first BTS and to decode the encoded data with the second matrix if the encoded data is transmitted from the second BTS.

Other aspects and advantageous features of the present invention will become apparent to those ordinarily skilled in the art upon review of the following description of specific embodiments of the invention in conjunction with the accompanying figures.

BRIEF DESCRIPTION OF THE FIGURES

Preferred embodiments of the present invention will now be described in detail with reference to the following figures.

DETAILED DESCRIPTION OF THE PREFERRED EMBODIMENTS

Figure 1B:
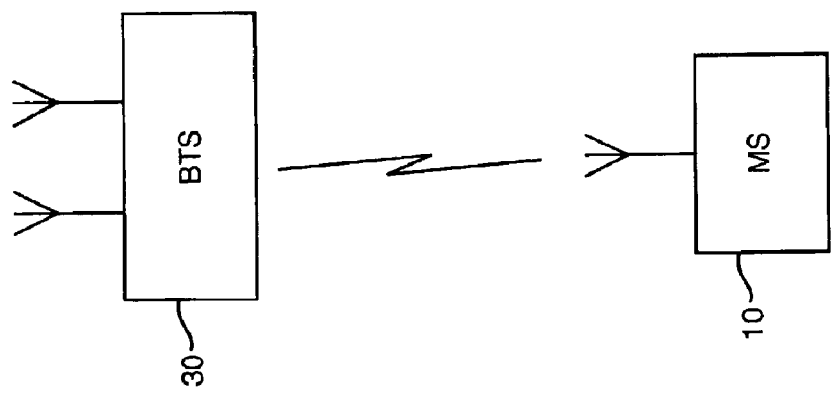
FIGS. 1A and 1B are block diagrams of simple wireless networks in which an MS is communicating with BTSs that comprise four antennas and two antennas respectively.
Figure 1A:
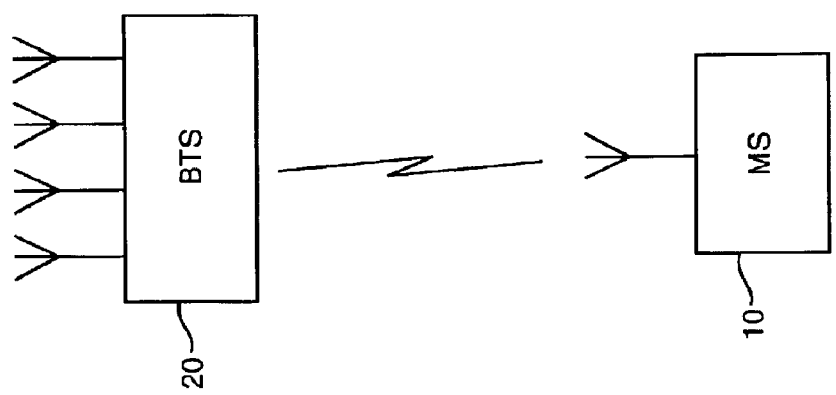

FIG. 1A illustrates a block diagram of a Mobile Station (MS) 10 communicating with a Base Transceiver Station (BTS) 20 that comprises four antennas. FIG. 1B illustrates a block diagram of the same MS 10 communicating with a BTS 30 that comprises two antennas. With each of these BTSs 20, 30 utilizing different Space-Time encoding matrices, the MS 10 in the past would require two separate decoding algorithms. As will be described herein below, with use of the present invention, the MS 10 can communicate with both BTSs 20, 30 with a single space-time decoder.

The selection of the space-time encoding matrix within the BTSs 20, 30 is important to allow for the MS 10 to have only a single decoder for communicating with the two BTSs. In embodiments of the present invention, the generation of the space-time encoding matrix requires a number of steps. Firstly, the designer must select all potential numbers of antenna that a MS might wish to communicate. In the case illustrated in FIGS. 1A and 1B, that would mean that the designer wants the MS to be able to communicate with a BTS with four antennas and a BTS with two antennas. Next, the designer must generate an orthogonal space-time matrix for the greatest number of antenna that the MS might communicate while ensuring that a subset of the matrix, that being the matrix with one or more set of rows and respective columns removed, also is an orthogonal matrix that is suitable for use as a space-time matrix. To generate this space-time matrix, the designer must ensure that:

$$S_n \cdot S_n^T = I$$

and $$S_m \cdot S_m^T = I$$

where n and m are first and second numbers of antennas that the MS may need to communicate and $S_n$ is an n×n space-time matrix for communicating with n antennas and $S_m$ is a subset of matrix $S_n$.

In the case as illustrated in FIGS. 1A and 1B, a space-time matrix that satisfies these conditions is:

$$S_n = \begin{bmatrix} 0 & x_3 & x_2 & x_1 \\ -x_3 & 0 & x_1^* & -x_2^* \\ -x_2 & -x_1^* & 0 & x_3^* \\ -x_1 & x_2^* & -x_3^* & 0 \end{bmatrix}$$

where n=4 and $x_1$, $x_2$ and $x_3$ are a plurality of complex numbered data streams that have been encoded. In the case that m=2 as in FIG. 1B, matrix $S_m$ could be:

$$S_m = \begin{bmatrix} x_2 & x_1 \\ x_1^* & -x_2^* \end{bmatrix}$$

It should be understood that although the implementation described above is specific to a case with n being 4 and m being 2, space-time encoding matrices $S_n$, $S_m$ could be generated with other values for n and m. Further, it should be understood that this concept could be expanded to cases in which the MS must communicate with BTSs with more than two different numbers of antennas.

Figure 2:
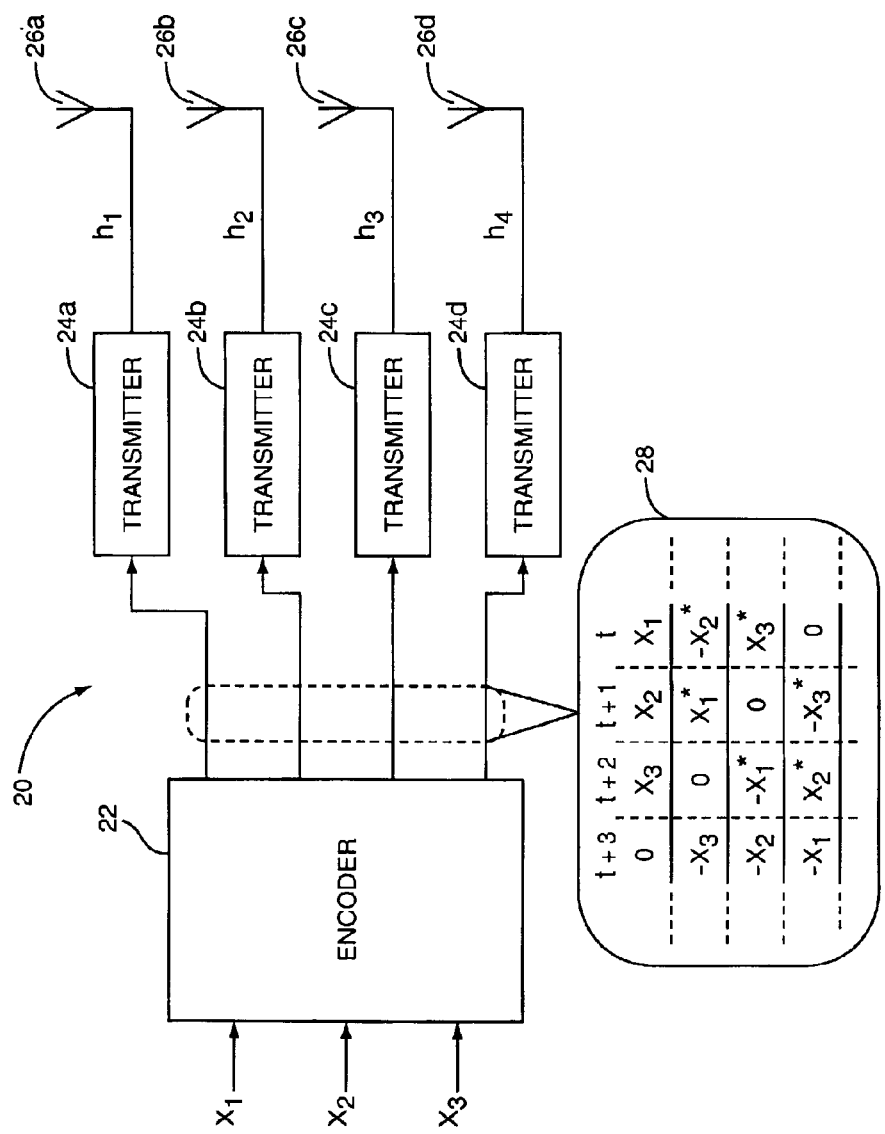
FIG. 2 is a block diagram of the BTS comprising four antennas of FIG. 1 according to an embodiment of the present invention.

FIG. 2 illustrates a block diagram of the BTS 20 of FIG. 1 according to an embodiment of the present invention. In this case, the BTS 20 comprises an encoder 22; a plurality of transmitters 24a,24b,24c,24d each independently coupled to the encoder 22; and a plurality of antennas 26a,26b,26c, 26d, each of which is coupled to a respective one of the transmitters 24a,24b,24c,24d. As illustrated, the encoder 22 is input with three complex numbered data streams $x_1$, $x_2$ and $x_3$ and output different expressions containing these data streams for each of the transmitters 24a,24b,24c,24d at four different time periods as dictated by the BTS's space-time encoding matrix as described above. This is shown pictorially in window 28. In this case, at time t, $x_1$ is output to the transmitter 24a, $-x_2^*$ is output to transmitter 24b, $x_3^*$ is output to transmitter 24c and nothing is output to transmitter 24d. As shown in FIG. 2, further time periods t+1,t+2,t+3 have additional expressions of the data streams output to the transmitters 24a,24b,24c,24d. The transmitters than transmit these expressions via respective antennas 26a,26b,26c,26d.

Figure 3:
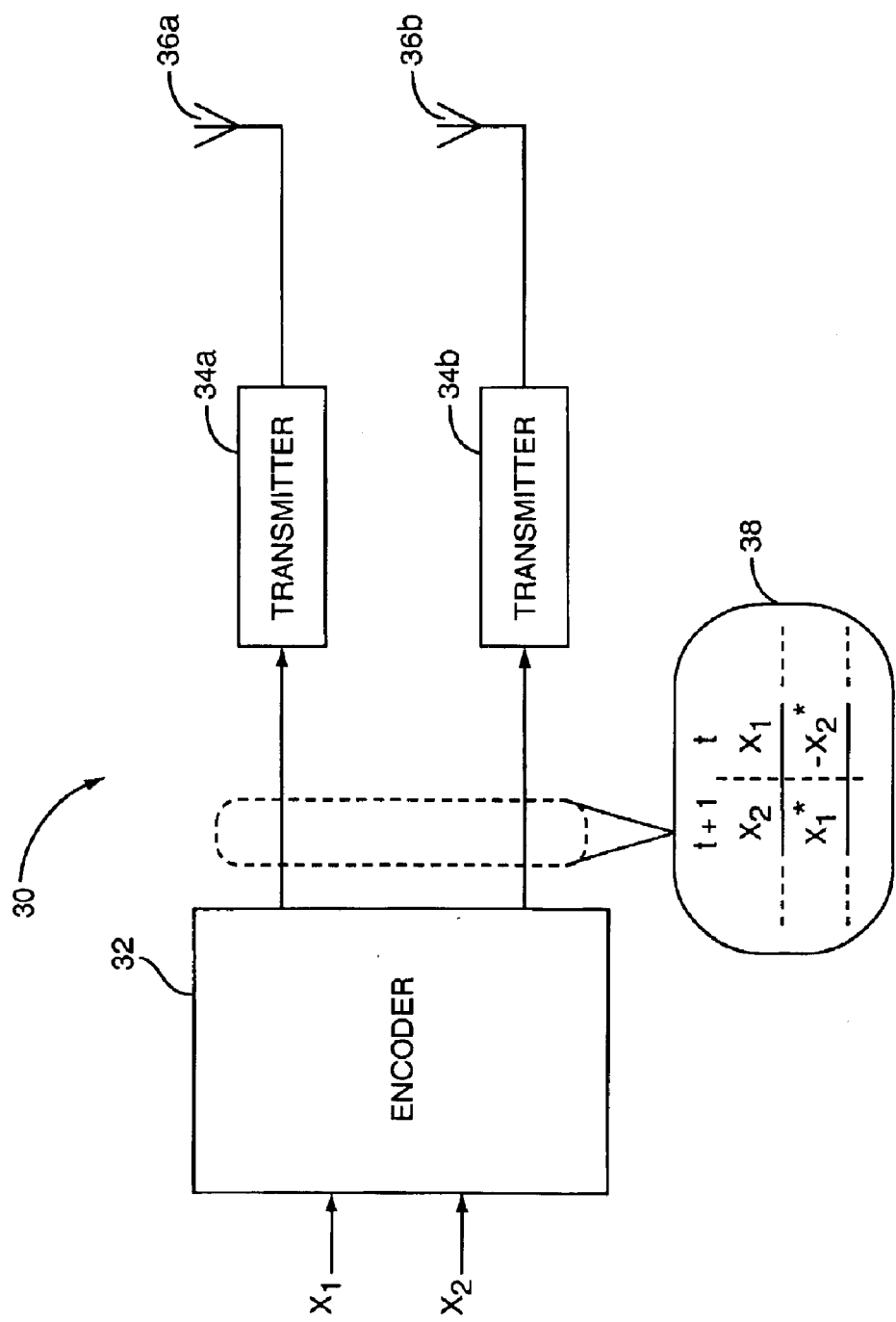
FIG. 3 is a block diagram of the BTS comprising two antennas of FIG. 1 according to an embodiment of the present invention.

FIG. 3 illustrates a block diagram of the BTS 30 of FIG. 1 according to an embodiment of the present invention. In this case, similar to that described above for the BTS 20, the BTS 30 comprises an encoder 32; a plurality of transmitters 34a,34b each independently coupled to the encoder 32; and a plurality of antennas 36a,36b, each of which is coupled to a respective one of the transmitters 34a,34b. As illustrated, the encoder 32 is input with two complex numbered data streams $x_1$ and $x_2$ and output different expressions containing these data streams for each of the transmitters 34a,34b at two different time periods as dictated by the BTS's space-time encoding matrix. This is shown pictorially in window 38. In this case, at time t, $x_1$ is output to the transmitter 34a and $-x_2$ is output to transmitter 34b. At time period t+1, $x_2$ is output to the transmitter 34a and $x_1$ is output to transmitter 34b. The transmitters than transmit these expressions via respective antennas 36a,36b similar to that discussed above for the BTS of FIG. 2.

Figure 4:
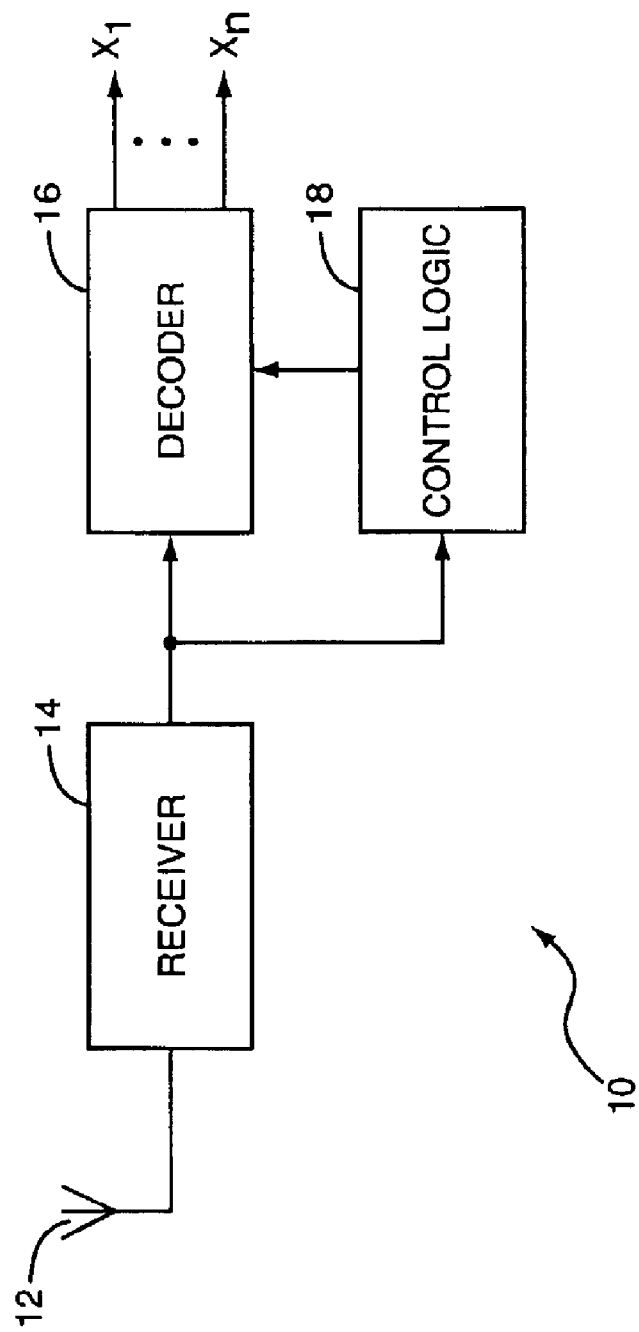
FIG. 4 is a block diagram of the MS of FIG. 1 according to an embodiment of the present invention.

FIG. 4 illustrates a block diagram of the MS 10 of FIG. 1 in one embodiment of the present invention. As illustrated, the MS 10 comprises an antenna 12 coupled in series with a receiver 14 and a decoder 16. Further, the MS 10 comprises control logic 18 that is coupled to the receiver 14 and the decoder 16. In this implementation, the antenna 12 receives linearly combined representations of the encoded data transmitted by either BTS 20 or BTS 30 and the receiver 14 does well-known preliminary processing on this received data. The control logic 18 determines the size of the set of antennas that were utilized to transmit the data. This is done, in one embodiment, through control signaling between the control logic 18 and other components within the network such as possibly the BTS communicating with the MS. Alternatively, the control logic 18 could apply interpolation on the incoming data to determine the number of encoded data streams that are present, and hence, the number of antennas that were used to transmit the encoded data.

The decoder 16 receives the determination with respect to the number of antennas utilized during transmission from the control logic 18 and further receives the encoded data from the receiver 14. The decoder has a space-time encoding matrix stored for the decoding process, this matrix being the space-time encoding matrix used if the maximum number of antennas are used during transmission of the data to the MS (this matrix hereinafter being referred to as the full space-time matrix).

In each particular circumstance, the decoder 16 generates the space-time matrix that was used to generate the encoded data by either utilizing the full matrix that is stored within the decoder, if the number of antennas used during transmission is equal to the number of rows within the full matrix, or, alternatively, utilizing a subset of the full matrix, if the number of antennas used during transmission of the encoded data is less than the number of rows within the full matrix. The subset of the full matrix is generated by taking the full space-time matrix and removing a set of rows and columns from it. The number of rows and columns removed is equal to the difference between the number of rows in the full matrix and the number of antenna determined to be used during transmission of the particular encoded data. In the design of the full space-time encoding matrix, as described above, the removal of the rows and columns will result in the generation of another orthogonal space-time encoding matrix that is utilized by BTSs that utilize less than the maximum number of antennas in their transmissions.

In the example of FIGS. 1A, 1B, 2 and 3, the space-time encoding matrix that the decoder 16 utilizes in the case of communications with the BTS 30 is the full matrix of four rows minus the difference between the number of rows and the number of antenna used during transmission (4−2=2). Therefore, two rows and their respective columns are removed from the full space-time matrix in this example to generate the space-time matrix (2×2) that the decoder uses to decode the data received from the BTS 30.

It should be recognized that although described above for only complex numbered data streams, the present invention could be implemented in the case that that the data streams are real numbers. For example, a case where the maximum number of antennas for a BTS within the network is eight and there are eight real numbered data streams could utilize the following full space-time encoding matrix:

$$S = \begin{bmatrix} x_1 & x_2 & x_3 & x_4 & x_5 & x_6 & x_7 & x_8 \\ x_2 & -x_1 & -x_4 & x_3 & -x_6 & x_5 & x_8 & -x_7 \\ x_3 & x_4 & -x_1 & x_2 & -x_7 & -x_8 & x_5 & x_6 \\ x_4 & -x_3 & x_2 & -x_1 & -x_8 & x_7 & -x_6 & -x_5 \\ x_5 & x_6 & x_7 & x_8 & -x_1 & -x_2 & -x_3 & -x_4 \\ x_6 & -x_5 & x_8 & -x_7 & x_2 & -x_1 & x_4 & -x_3 \\ x_7 & -x_8 & -x_5 & x_6 & x_3 & -x_4 & -x_1 & x_2 \\ x_8 & x_7 & -x_6 & -x_5 & x_4 & x_3 & -x_2 & -x_1 \end{bmatrix}$$

If less than eight antennas are utilized at the BTS, a specified number of the rows and respective columns could be removed from the full matrix to generate further orthogonal space-time matrices for these situations.

Persons skilled in the art will appreciate that there are alternative implementations and modifications of the present invention, and that the above described implementation is only an illustration of specific embodiments of the invention. Therefore, the scope of the invention should only be limited by the claims appended hereto.

Appendices that aid in the understanding of the present invention are further incorporated within the present specification. Appendix 1 is a currently unpublished paper entitled "Pragmatic Space-Time Codes" that concerns the present invention. Appendix 2 is a set of slides entitled "Pragmatic Space-time Code" that concerns the present invention. Appendix 3 is a published paper entitled "Space-Time Codes for High Data Rate Wireless Communication: Performance Criterion and Code Construction". Appendix 4 is a published paper entitled "A Simple Transmit Diversity Technique for Wireless Communications". Appendix 5 is a published paper entitled "Space-Time Block Coding for Wireless Communications: Performance Results".

We claim:

1. A space-time decoder arranged to be coupled to an antenna within a receiver, the decoder comprising:
   a port, arranged to be coupled to the antenna, that operates to receive space-time encoded data that is received on the antenna;
   control logic that operates to determine the number of antennas by which the encoded data was transmitted to the antenna within the receiver;
   decoding logic, coupled to the port and the control logic, that operates to decode the encoded data with a first orthogonal space-time matrix if the encoded data is transmitted via a first plurality of antennas and operates to decode the encoded data with a second orthogonal space-time matrix, which is a subset of the first matrix, if the encoded data is transmitted via a second plurality of antennas, the second plurality being less than the first plurality.

2. A space-time decoder according to claim 1, wherein the control logic utilizes control signalling between the receiver and an apparatus transmitting the encoded data to determine the number of antennas by which the encoded data was transmitted to the antenna within the receiver.

3. A space-time decoder according to claim 1, wherein the first plurality is equal to n and the second plurality is equal to m; and
   wherein the first matrix is an n×n matrix and the second space-time matrix is an m×m matrix which comprises the first matrix with n−m rows and columns removed.

4. A space-time decoder according to claim 1, wherein the first plurality is equal to four.

5. A space-time decoder according to claim 4, wherein the first matrix is:

$$\begin{bmatrix} 0 & x_3 & x_2 & x_1 \\ -x_3 & 0 & x_1^* & -x_2^* \\ -x_2 & -x_1^* & 0 & x_3^* \\ -x_1 & x_2^* & -x_3^* & 0 \end{bmatrix}$$

wherein $x_1$, $x_2$ and $x_3$ are three complex numbered data streams that are to be decoded.

6. A space-time decoder according to claim 1, wherein the second plurality is equal to two.

7. A space-time decoder according to claim 6, wherein the second matrix is:

$$\begin{bmatrix} x_2 & x_1 \\ x_1^* & -x_2^* \end{bmatrix}$$

wherein $x_1$ and $x_2$ are two complex numbered data streams that are to be decoded.

8. A space-time decoder according to claim 1, wherein the first plurality is equal to four and the second plurality is equal to two;
   wherein the first matrix is:

$$\begin{bmatrix} 0 & x_3 & x_2 & x_1 \\ -x_3 & 0 & x_1^* & -x_2^* \\ -x_2 & -x_1^* & 0 & x_3^* \\ -x_1 & x_2^* & -x_3^* & 0 \end{bmatrix}$$

wherein $x_1$, $x_2$ and $x_3$ are three complex numbered data streams that are to be decoded; and
   wherein the second matrix is:

$$\begin{bmatrix} x_2 & x_1 \\ x_1^* & -x_2^* \end{bmatrix}$$

wherein $x_1$ and $x_2$ are two complex numbered data streams that are to be decoded.

9. A space-time decoder according to claim 1, wherein the first plurality is equal to eight.

10. A space-time decoder according to claim 9, wherein the first matrix is:

$$\begin{bmatrix} x_1 & x_2 & x_3 & x_4 & x_5 & x_6 & x_7 & x_8 \\ x_2 & -x_1 & -x_4 & x_3 & -x_6 & x_5 & x_8 & -x_7 \\ x_3 & x_4 & -x_1 & x_2 & -x_7 & -x_8 & x_5 & x_6 \\ x_4 & -x_3 & x_2 & -x_1 & -x_8 & x_7 & -x_6 & -x_5 \\ x_5 & x_6 & x_7 & x_8 & -x_1 & -x_2 & -x_3 & -x_4 \\ x_6 & -x_5 & x_8 & -x_7 & x_2 & -x_1 & x_4 & -x_3 \\ x_7 & -x_8 & -x_5 & x_6 & x_3 & -x_4 & -x_1 & x_2 \\ x_8 & x_7 & -x_6 & -x_5 & x_4 & x_3 & -x_2 & -x_1 \end{bmatrix}$$

wherein $x_1$, $x_2$, $x_3$, $x_4$, $x_5$, $x_6$, $x_7$ and $x_8$ are eight real numbered data streams that are to be decoded.

11. A Mobile Station comprising:
   an antenna that operates to receive space-time encoded data;
   control logic that operates to determine the number of antennas by which the encoded data was transmitted to the antenna; and
   decoding logic, coupled to the antenna and the control logic, that operates to decode the encoded data with a first orthogonal space-time matrix if the encoded data is transmitted via a first plurality of antennas and operates to decode the encoded data with a second orthogonal space-time matrix, which is a subset of the first matrix, if the encoded data is transmitted via a second plurality of antennas, the second plurality being less than the first plurality.

12. A method for space-time decoding data at a receiver that has been transmitted via a plurality of antennas, the method comprising:
   receiving space-time encoded data;
   determining the number of antennas in which the encoded data was transmitted;
   decoding the encoded data with a first orthogonal space-time matrix if the number of antennas equals n; and
   decoding the encoded data with a second orthogonal space-time matrix, which is a subset of the first matrix, if the number of antennas equals m, m being less than n.

13. A space-time decoder arranged to be coupled to an antenna within a receiver, the decoder comprising:
   means for receiving space-time encoded data that is received on the antenna;
   means for determining the number of antennas by which the encoded data was transmitted to the antenna within the receiver;
   first means for decoding the encoded data with a first orthogonal space-time matrix if the encoded data is transmitted via a first plurality of antennas; and
   second means for decoding the encoded data with a second orthogonal space-time matrix, which is a subset of the first matrix, if the encoded data is transmitted via a second plurality of antennas, the second plurality being less than the first plurality.

14. A space-time encoder arranged to be coupled to a plurality of transmitters, the encoder comprising:
   a port that operates to receive a plurality of data streams; and
   space-time encoding logic, coupled to the port, that operates to encode the plurality of data streams with an orthogonal space-time matrix such that each of the plurality of transmitters is forwarded a transmission for a plurality of time periods;
   wherein at least one subset of the space-time matrix, in which one or more sets of rows and columns are removed from the space-time matrix, is orthogonal.

15. A space-time encoder according to claim 14, wherein the plurality of transmitters equals four transmitters and the space-time matrix is:

$$\begin{bmatrix} 0 & x_3 & x_2 & x_1 \\ -x_3 & 0 & x_1^* & -x_2^* \\ -x_2 & -x_1^* & 0 & x_3^* \\ -x_1 & x_2^* & -x_3^* & 0 \end{bmatrix}$$

wherein $x_1$, $x_2$ and $x_3$ are the plurality of data streams, each data stream being complex numbered.

16. A space-time encoder according to claim 14, wherein the plurality of transmitters equals eight transmitters and the space-time matrix is:

$$\begin{bmatrix} x_1 & x_2 & x_3 & x_4 & x_5 & x_6 & x_7 & x_8 \\ x_2 & -x_1 & -x_4 & x_3 & -x_6 & x_5 & x_8 & -x_7 \\ x_3 & x_4 & -x_1 & x_2 & -x_7 & -x_8 & x_5 & x_6 \\ x_4 & -x_3 & x_2 & -x_1 & -x_8 & x_7 & -x_6 & -x_5 \\ x_5 & x_6 & x_7 & x_8 & -x_1 & -x_2 & -x_3 & -x_4 \\ x_6 & -x_5 & x_8 & -x_7 & x_2 & -x_1 & x_4 & -x_3 \\ x_7 & -x_8 & -x_5 & x_6 & x_3 & -x_4 & -x_1 & x_2 \\ x_8 & x_7 & -x_6 & -x_5 & x_4 & x_3 & -x_2 & -x_1 \end{bmatrix}$$

wherein $x_1$, $x_2$, $x_3$ $x_4$, $x_5$, $x_6$, $x_7$ and $x_8$ are the plurality of data streams, each data stream being real numbered.

17. A Base Transceiver Station comprising:
   a port that operates to receive a plurality of data streams;
   a plurality of antennas; and
   space-time encoding logic, coupled between the port and the plurality of antennas, that operates to encode the plurality of data streams with an orthogonal space-time matrix such that each of the plurality of antennas is forwarded a transmission for a plurality of time periods;
   wherein at least one subset of the space-time matrix, in which one or more sets of rows and columns are removed from the space-time matrix, is orthogonal.

18. A method for encoding a plurality of data streams for transmission on a plurality (n) of antennas, the method comprising:
   receiving a plurality of data streams; and
   generating an output at each of the n antenna for each of n time periods using an orthogonal space-time matrix;
   wherein at least one subset of the space-time matrix, in which one or more sets of rows and columns are removed from the space-time matrix, is orthogonal.

19. A space-time encoder arranged to be coupled to a plurality of transmitters, the encoder comprising:
   means for receiving a plurality of data streams; and
   means for encoding the plurality of data streams with an orthogonal space-time matrix such that each of the plurality of transmitters is forwarded a transmission for a plurality of time periods;
   wherein at least one subset of the space-time matrix, in which one or more sets of rows and columns are removed from the space-time matrix, is orthogonal.

20. A method for generating a space-time encoding matrix for use in transmitting a plurality of data streams to a receiver from a plurality of antenna within a wireless network, the method comprising:
   selecting a maximum number (n) of antennas to be used within the wireless network;
   selecting at least one other number (m) of antennas that could possibly be used in the wireless network; and
   determining an n×n space-time encoding matrix that is orthogonal and which has an m×m subset which is also orthogonal.

21. A wireless network comprising:
   a first Base Transceiver Station (BTS), with a first plurality of antennas, that operates to encode a set of data streams with a first orthogonal space-time matrix and transmit the resulting encoded data on the first plurality of antennas;
   a second BTS, with a second plurality of antennas less than the first plurality, that operates to encode a set of data streams with a second orthogonal space-time matrix, which is a subset of the first matrix, and transmit the resulting encoded data on the second plurality of antennas; and
   a Mobile Station (MS) that operates to receive encoded data from either one of the first and second BTSs, to decode the encoded data with the first matrix if the encoded data is transmitted from the first BTS and to decode the encoded data with the second matrix if the encoded data is transmitted from the second BTS.

* * * * *